United States Patent [19]
Anglin et al.

[11] Patent Number: 5,911,148
[45] Date of Patent: Jun. 8, 1999

[54] AUTOMATED MESSAGE PROCESSING SYSTEM CONFIGURED FOR AUTOMATED TAPE DEVICE MANAGEMENT

[75] Inventors: Matthew Joseph Anglin, Vail; Gregory Tad Kishi, Oro Valley, both of Ariz.

[73] Assignee: International Business Machines Corporation, Armonk, N.Y.

[21] Appl. No.: 08/865,444

[22] Filed: May 29, 1997

[51] Int. Cl.$^6$ .................................................. G06F 12/00
[52] U.S. Cl. ............................................................ 711/111
[58] Field of Search .................................. 711/111, 161; 369/34

[56] References Cited

U.S. PATENT DOCUMENTS

| | | | |
|---|---|---|---|
| 4,467,421 | 8/1984 | White ........................................ | 364/200 |
| 4,638,424 | 1/1987 | Beglin et al. ............................. | 364/200 |
| 4,755,928 | 7/1988 | Johnson et al. .......................... | 364/200 |
| 4,769,782 | 9/1988 | Iwanaga ................................... | 364/900 |
| 5,088,026 | 2/1992 | Bozman et al. .......................... | 395/425 |
| 5,121,483 | 6/1992 | Monahan et al. . | |
| 5,129,076 | 7/1992 | Freeman et al. . | |
| 5,155,835 | 10/1992 | Belsan ...................................... | 395/425 |
| 5,247,638 | 9/1993 | O'Brien et al. .......................... | 395/425 |
| 5,287,459 | 2/1994 | Gniewek . | |
| 5,386,545 | 1/1995 | Gombos, Jr. et al. ................... | 395/575 |
| 5,408,630 | 4/1995 | Moss ........................................ | 395/425 |
| 5,410,697 | 4/1995 | Baird et al. .............................. | 395/650 |
| 5,418,971 | 5/1995 | Carlson . | |
| 5,491,810 | 2/1996 | Allen ........................................ | 395/444 |
| 5,513,336 | 4/1996 | Vishlitzky et al. ...................... | 395/463 |
| 5,519,844 | 5/1996 | Stallmo .................................... | 395/441 |
| 5,537,568 | 7/1996 | Yanai et al. .............................. | 395/445 |
| 5,546,557 | 8/1996 | Allen et al. .............................. | 395/438 |
| 5,566,348 | 10/1996 | Dahman et al. . | |
| 5,584,008 | 12/1996 | Shimada et al. ......................... | 395/441 |
| 5,598,528 | 1/1997 | Larson et al. ....................... | 395/182.05 |
| 5,613,154 | 3/1997 | Burke et al. ............................. | 395/821 |
| 5,659,440 | 8/1997 | Acosta et al. . | |
| 5,675,736 | 10/1997 | Brady et al. . | |
| 5,809,511 | 9/1998 | Peake . | |

OTHER PUBLICATIONS

"Multitasking Volume Backup in a Space Management Program", T.W. Beglin, *IBM Technical Disclosure Bulletin*, vol. 24, No. 5, Oct. 1981, pp. 2418–2419.

"Logical Grouping of Data Storage Media in a Library System", *IBM Technical Disclosure Bulletin*, vol. 35, No. 5, Oct. 1992, pp. 17–20.

"Scratch Tape Drive Allocation Algorithm for Multiple Tape Libraries", *IBM Technical Disclosure Bulletin*, vol. 36, No. 11, Nov. 1993, pp. 249–251.

"Requesting Operator to Preload Integrated Cartridge Loader in Managed Manual Mode Library", *IBM Technical Disclosure Bulletin*, vol. 39, No. 04, Apr. 1996, p. 271.

"Automatic Cartridge Facility Usage in a 3495 Library", *IBM Technical Disclosure Bulletin*, vol. 39, No. 10, Oct. 1996, pp. 55–56.

*IBM Technical Disclosure Bulletin*, vol. 37, No. 06A, Jun. 1994, "High Capacity DASD Dual–Copy Secondary to Multiple 3390 Primary Devices", pp. 493–497.

U.S. Patent Application No. 08/778,118, Filed Jan. 2, 1997, entitled "Outboard Data Migration in a Volume Stacking Library", in the names of J. W. Peake et al.

U.S. Patent Application No. 08/707,891, Filed Sep. 10, 1996, entitled "Virtual Integrated Cartridge Loader for Virtual Tape Storage System", in the names of Carlson et al.

*Primary Examiner*—John W. Cabeca
*Assistant Examiner*—Felix B. Lee
*Attorney, Agent, or Firm*—Gray Cary Ware Freidenrich

[57] ABSTRACT

Replacing a human operator, an automated message processing system communicates with a data storage subsystem that includes a tape library and a storage controller. The automated message processing system receives messages from a data storage subsystem concerning the availability of tape drives in the tape library. Such messages are selectively routed to one of many specialized expert local facilities (ELFs) for performance of a designated function, such as generation of an appropriate output messages. The ELFs receive input messages and transmit output to the data storage subsystem in order to oversee allocation and use of data storage drives in the data storage subsystem.

29 Claims, 7 Drawing Sheets

AUTOMATED MESSAGE PROCESSING SYSTEM CONFIGURED FOR AUTOMATED TAPE DEVICE MANAGEMENT

BACKGROUND OF THE INVENTION

1. Field of the Invention

The present invention relates to a system that processes and responds to messages generated by a digital data processing machine. More particularly, the invention concerns an apparatus, article of manufacture, and method for receiving both immediate-response and delayed-response messages from a data storage subsystem, selectively routing the messages to specialized expert local facilities (ELFs), performing designated functions at the ELFs, generating an appropriate output message, and transmitting the output message to the data storage subsystem. According to the invention, these messages concern the management of data storage devices such as tape drives in the data storage subsystem.

2. Description of the Related Art

Many different machines require operator supervision. Although automation is increasing, some type of management by an operator is still required for many simple machines such as drill presses, facsimile machines, and sewing machines. With more complicated machines, an operator is even more important, to perform critical and often complicated duties.

For example, most mass data storage systems require some type of operator support. Such data storage systems often store customer data on magnetic tapes, magnetic disk drives, or a combination of the two. These systems need an operator to perform error/exception handling, to backup data, to configure hardware devices, and to perform other functions. Furthermore, in storage libraries employing portable data storage units, such as tapes, operators must manage the media pool. This involves, for instance, supplying blank media, labelling tapes, advising the system when new tapes are introduced, and the like.

Thus, the operator provides the mass storage system with a number of benefits. On the other hand, use of an operator also comes with a number of drawbacks. One drawback, for example, is the cost of paying a highly trained person to monitor the data storage system. It may even be necessary to have an operator at hand twenty-four hours a day in systems that store particularly important data, such as automated teller machines, telephone directory information, internationally accessible data, and the like. In these systems, the cost of the operator can be substantial.

Another drawback of human operators is the potential for human mistakes. And, with human operators comes the possibility of human work scheduling problems. The operator's absence from the data storage system at a critical time may have serious consequences. For example, recovery from certain types of system errors may be impossible without operator intervention, thus rendering the entire storage system inoperative.

As a further example, one particularly important yet difficult operator task involves reconciling tape drive availability in a mass storage system. Many mass storage systems include tape libraries supervised by a library manager that oversees a plurality of tape media and along with multiple tape drives. Frequently, the tape library is managed by a storage controller. The human operator must ensure that the storage controller and tape library both accurately monitor tape drive availability in the tape library. This may be achieved, for example, by sending update messages to the storage controller and tape library, as needed. If a disagreement occurs between storage controller and tape library accounting of the drives' availability, there may be an improper attempt to allocate an already-busy tape drive.

Without careful tracking, the accounting of which drives are busy can differ between the storage controller and the library manager. This can easily occur, since no central authority renders a tape drive "available" or "unavailable" in some systems. A drive can become occupied, or free up, due to actions of the library manager, the storage controller, or even a service technician.

Another important reason to accurately track the number of available drives involves cache management. In some systems, data read from tape at tape drives is read into a cache to expedite access to the data. If all tape drives are reading simultaneously, with none writing, the cache may quickly fill, ultimately overflowing and causing an error. Therefore, it may be desirable to reserve one or more tape drives for writing data out from the cache. The benefits of such tape drive management underscore the need to accurately track tape drive availability, both in the storage controller and also in the library manager. However, as discussed previously, the use of a human operator has a number of limitations.

SUMMARY OF THE INVENTION

Broadly, the present invention concerns an automated message processing system for communicating with a data storage subsystem. In short, the automated message processing system receives messages from a data storage subsystem concerning the availability of tape drives in a tape library of the data storage subsystem. These messages are selectively routed to one of many specialized ELFs for performance of a designated function, such as the generation of an appropriate output message for subsequent transmission to the data storage subsystem. The ELFs receive input messages and transmit output messages for the purpose of overseeing allocation and use of data storage drives in the data storage subsystem. The automated message processing system of the invention may be implemented, for example, by programming a computer.

As a more detailed example, the automated message processing system includes a sorting and transmitting administrator (SANTA) coupled to the data storage subsystem to receive messages therefrom. The SANTA selectively routes each message to one of a plurality of expert local facilities (ELFs) according to the content of the received message. The messages include, for example, immediate-response messages and delayed-response messages. The SANTA includes a command response unit coupled to the data storage subsystem, which receives immediate-response messages from the data storage subsystem and routes each immediate-response message to an appropriate one of the ELFs in response to routing criteria received at a routing input. The SANTA also includes a message console coupled to the data storage subsystem to receive delayed-response messages and route all delayed-response messages to a predetermined one of the ELFs.

Each of the plurality of ELFs includes one or more inputs each coupled to the command response unit, the message console, or an activating source such as a timer, an external source, or another ELF. Each ELF "activates" in response to signals, "stimuli" responsively performing certain predetermined functions. These functions include generating an output message, and may also include processing of messages received from the SANTA.

The automated message processing system also includes a command generator coupled to the ELFs and the routing input of the command response unit. The command generator generates routing criteria specifying which of the ELFs to route each received immediate-response message, and forwards the routing criteria to the routing input. The command generator also receives output messages from the ELFs and creates formatted output messages by conforming the received output messages into a predetermined format. Furthermore, the command generator selects a destination in the data storage subsystem for each formatted output message, and appropriately dispatches the formatted output message to the selected destination.

In one embodiment, the invention may be implemented to provide a method for communicating with a data storage subsystem. In contrast, another embodiment of the invention may be implemented to provide an apparatus such as an automated message processing system. In still another embodiment, the invention may be implemented to provide a signal-bearing media tangibly embodying a program of machine-readable instructions executable by a digital data processing apparatus to perform method steps for communicating with a data storage subsystem.

The invention affords its users with a number of distinct advantages. Chiefly, the invention facilitates automated processing of messages generated by a data storage subsystem, in replacement of a human operator, in order to manage and track tape devices of the storage subsystem. Thus, the invention is especially advantageous because it avoids the cost of paying a highly trained person to monitor the data storage system, avoids the possibility of human errors, and guarantees nonstop mechanized supervision of the system. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Functional Components & Interrelationships

Figure 1:
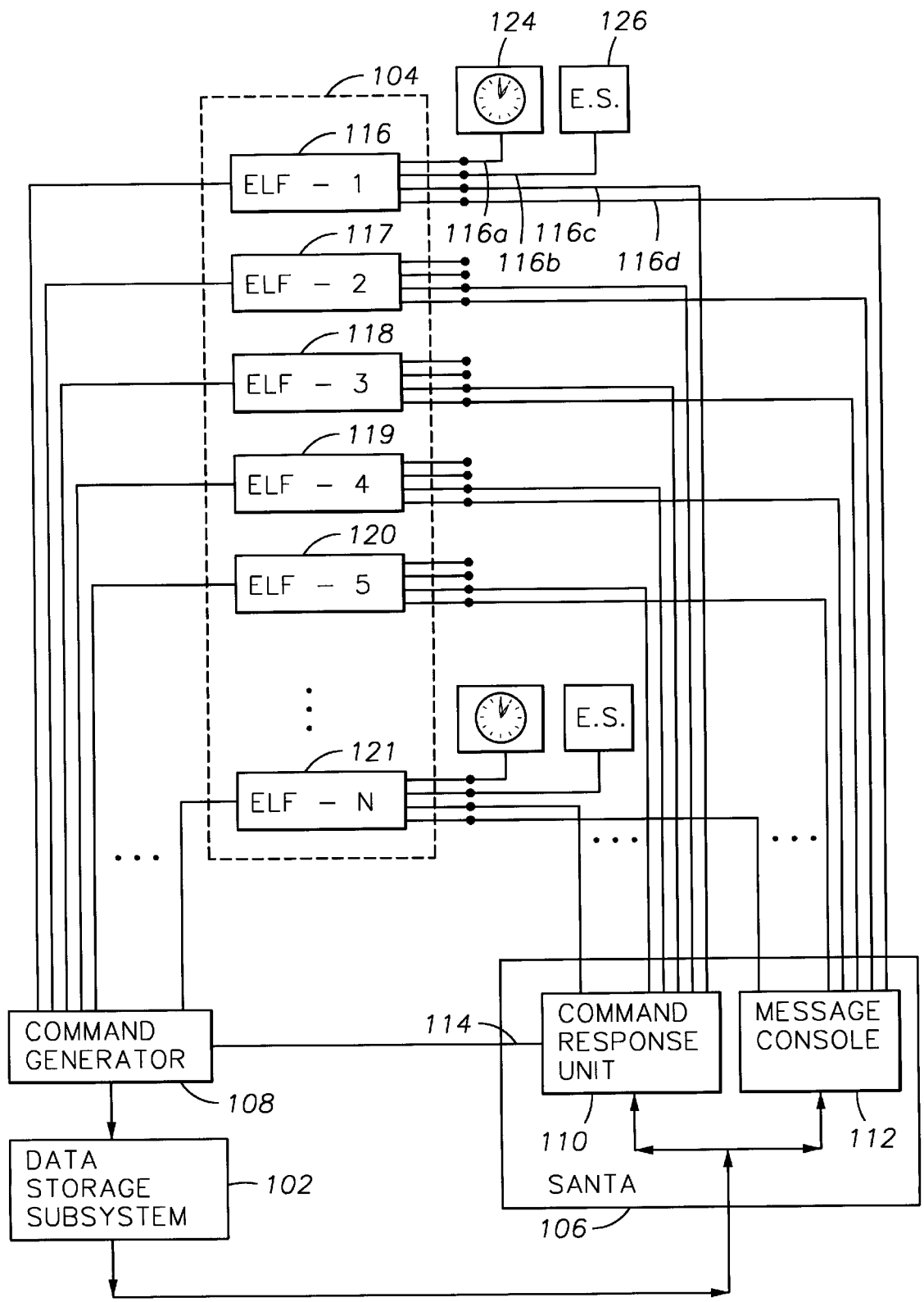
FIG. 1 is a block diagram showing functional components of an automated message processing system according to the invention.

One aspect of the invention concerns an automated message processing system, which may be embodied by various functional components and interrelationships. An example is given by the automated message processing system 100 of FIG. 1. As described in greater detail below, the components of the system 100 may be implemented with software functions, hardware devices, or a combination of both, depending upon the specific needs of the application.

Broadly, the automated message processing system 100 serves to communicate with a data storage subsystem 102. The automated message processing system 100 receives messages from the data storage subsystem 102, selectively routes each message to one of many specialized expert local facilities (ELFs) 104 for performance of a designated function and generation of an appropriate output message, and ultimately transmits the output message to the data storage subsystem 102.

Sorting and Transmitting Administrator (SANTA)

The system 100 includes a SANTA 106, which is coupled to the ELFs 104, the data storage subsystem 102, and a command generator 108. The SANTA 106, which may also be referred to as a "message director", includes a command response unit 110 and a message console 112. In the illustrated embodiment, the command response unit 110 and message console 112 are coupled multiple ELFs 104. Generally, the SANTA 106 orchestrates forwarding of messages received from the data storage subsystem 102 to the appropriate one of the ELFs 104.

As explained in greater detail below, the SANTA 106 receives messages from the data storage subsystem 102, these messages include immediate-response messages and delayed-response messages. As known by those of ordinary skill, "immediate-response" messages are received by a processor in response to an output of that processor, while the processor is specifically waiting for that message before proceeding. In the illustrated example, after the command generator 108 sends a message to the data storage subsystem 102, the system 100 waits for the SANTA 106 to receive an immediate-response message from the data storage subsystem 102, as discussed in greater detail below.

"Delayed-response" messages are also received by a processor in response to an output of that processor, however, the processor does not wait for that message after sending the original output. In the illustrated example, the command generator 108 sends a message to the data storage subsystem 102, then proceeds to other operations. At some later time, the SANTA 106 eventually receives the delayed-response message. In the mean time, the command generator 108 has been performing other tasks.

The command response unit 110 routes each immediate-response message to one of the ELFs 104 according to routing criteria received at a routing input 114. The message console 112 receives all delayed-response messages from the data storage subsystem 102, routing these messages to an appropriate one of the ELFs 104 according to the content of the delayed-response message.

Although not shown, the SANTA 106 may also include message queues for buffering messages to the ELFs 104.

Expert Local Facilities (ELFs)

As mentioned above, the system 100 includes a plurality of ELFs 104, each of which performs a limited and particular function called an "expert" function. As explained more thoroughly below, each expert function involves the processing of a number of specific input messages compatible with that ELF, where each message is processed by applying a predetermined processing routine particular to that message. Although other tasks may also be included, each processing routine results in generation of an output message, which is ultimately directed to the command generator 108. Although more than one ELF may perform a given function, preferably each ELF performs a unique function with respect to the other ELFs.

Each ELF includes one or more inputs for receiving messages and stimuli. Each input is coupled to the command response unit 110, the message console 112, a timer, or an external source. For example, in the case of the ELF 116, a first input 116a is coupled to a timer 124, a second input 116b is coupled to an external source 126, a third input 116d is coupled to the message console 112, and a fourth input 116d is coupled to the command response unit 110. The external source 126 may comprise a component external to the system 100, or even another ELF.

As discussed in greater detail below, an ELF "activates" in response to a stimulus signal received on the inputs, performing certain appropriate predetermined actions accordingly. These actions include generation of an output message, which is directed to the command generator 108 as discussed in greater detail below.

In an alternative embodiment, the SANTA 106 may be coupled to one or more external sources, permitting the ELFs to additionally receive external stimuli via the SANTA 106 rather than a directly coupled external source such as 126.

Command Generator

Coupled to each ELF 104, the command generator 108 receives output messages generated by the ELFs 104. The command generator 108 places these output messages in a predetermined format compatible with the data storage subsystem 102. The command generator 108 also selects a destination in the data storage subsystem 102 for sending each formatted output message, and ultimately dispatches the formatted output message to that destination. This may be achieved, for example, by selecting an appropriate component and/or address of the data storage subsystem 102, and sending the formatted output message to that component and/or address.

In addition to the ELFs 104, the command generator 108 is also coupled to the routing input 114 of the command response unit 110. The command generator 108 generates routing criteria specifying one or more ELFs 104 for the command response unit 110 to route each immediate-response message received by the unit 110 from the data storage subsystem 102. The command generator 108 forwards the routing criteria to the command response unit 110.

As an example, the routing criteria may identify an incoming message, a message identification code, a time window when the message is expected, or another characteristic of the window. As an alternative, the routing criteria may comprise a file or linked list or a group of messages identified by the first and/or last message in the group.

Implementation of Automated Message Processing System: One Example

The automated message processing system 100 may implemented in a number of different ways, depending upon the specific needs of the application. As an example, the components of FIG. 1 may be implemented using discrete circuitry, application-specific integrated circuitry, programmable circuit components, logic circuitry, or a combination.

As another alternative, some of the features of the system 100 may be implemented in software, while others are implemented using suitable hardware.

Figure 2:
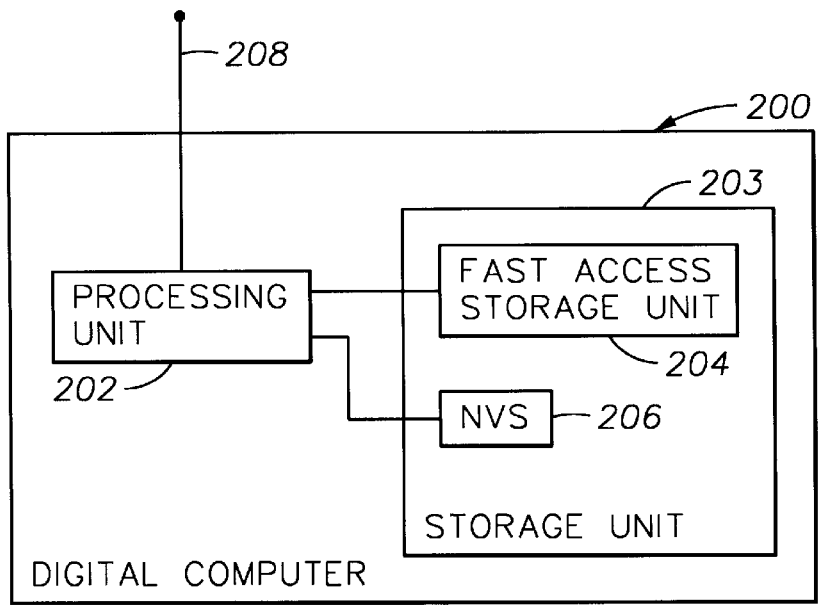
FIG. 2 is an illustrative hardware implementation of the automated message processing system of the invention.

In the preferred embodiment, however, the system 100 is implemented in software, by using a digital computer to execute a sequence of programming instructions. In this embodiment, then, the components of FIG. 1 are software modules or functional units, rather than physical hardware components. This embodiment may therefore be implemented using a digital computer, as shown in FIG. 2.

The computer 200 includes a processing unit 202, such as a microprocessor or other processing machine, coupled to a storage unit 203. In the present example, the storage unit 203 includes a fast-access storage unit 204 and a nonvolatile storage unit 206. The fast-access storage unit 204 preferably comprises random access memory, and may be used to store the programming instructions executed by the processing unit 202 during such execution. The nonvolatile storage unit 206 may comprise, for example, one or more magnetic data storage disks such as a "hard drive", a tape drive, or any other suitable storage device. The computer 200 also includes an input/output 208, such as a line, bus, cable, electromagnetic link, or other means for exchanging data with the processing unit 202.

Despite the specific foregoing description, ordinarily skilled artisans (having the benefit of this disclosure) will recognize that the system 100 may be still implemented in a computer of different construction, without departing from the scope of the invention. As a specific example, one of the storage units 204/206 may be eliminated; furthermore, the processing unit 202 may be provided with on-board storage, even though the storage unit 203 is shown separate from the processing unit 202. Moreover, some or all of the components 202/204/206 may be shared by other hardware devices (not shown), such as the data storage subsystem 102 itself.

Application of the Automated Message Processing System: One Example

Figure 3:
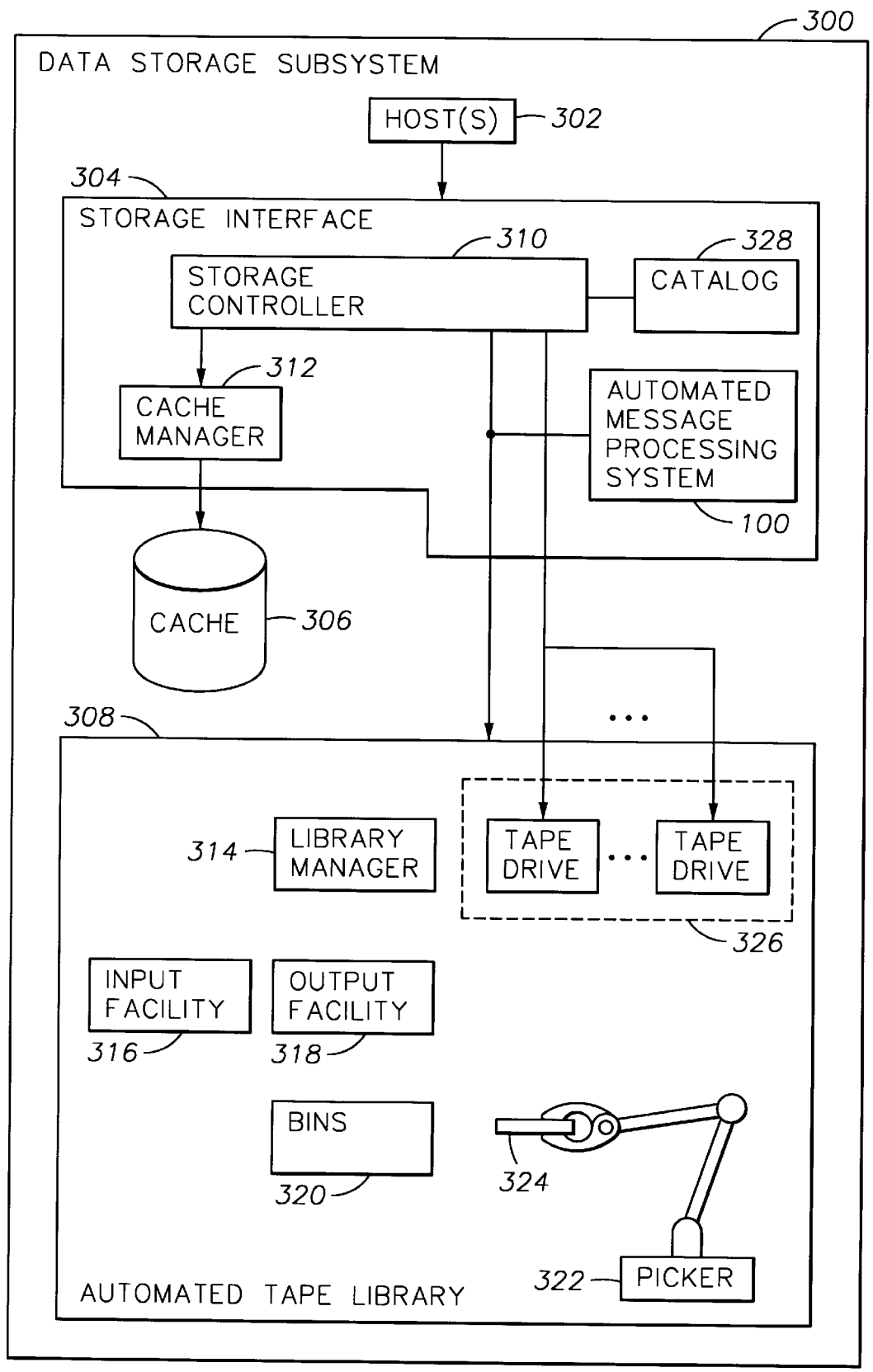
FIG. 3 is a specific hardware implementation using the automated message processing system of the invention as an automated system administrator for a mass data storage subsystem.

As one particularly useful application of the system 100, the system 100 may be used in the data storage subsystem 300 (FIG. 3), serving as an automated system administrator, in substitution for a human storage administrator. The subsystem 300 includes one or more hosts 302, a storage interface 304, and an automated tape library 308. Optionally, for reasons explained below, the subsystem 300 may also include a cache 306. In the illustrated embodiment, the automated message processing system 100 is implemented within a storage interface 304, where it is coupled to a storage controller 310 and the tape library 308.

Broadly, the hosts 302 comprises one or more units that utilize data stored on the cache 306 and library 308. The storage interface 304 exchanges data between the hosts 302 and the cache 306, and between the hosts 302 and the library 308. These exchanges are conducted in accordance with commands from the host 302. The storage interface 304 also oversees data transfers from the cache 306 to the library 308 (e.g., "destaging" operations) and data transfers from the library 308 to the cache 306 (e.g., "staging" operations due to cache misses).

The automated tape library 308 is an apparatus that manages the storage, loading, unloading, movement, writing, and reading of tape cartridges ("tapes"), such as the tape 324. The tapes 324 are stored in bins 320. A picker 322, such as robotic arm, selectively collects tapes 324 from an input facility 316, carries tapes to an output facility 318, and exchanges tapes as required with tape drives 326. The input facility 316, for example, may include one or more tape storage slots along with a batch loading mechanism (not shown) for receiving tapes from an operator. Similarly, the output facility 318 may include one or more tape storage slots along with a batch output mechanism (not shown) for transferring tapes from the library 308 to an operator.

The tape library 308 may comprise a new design, or a conventional tape library. As an example, the tape library 308 may comprise an IBM model 3494 tape library with at least (1) an IBM 3490 model C2A tape drive to access the following types of tapes: the IBM CST tape (standard cartridge system tape, 18 or 36 track format), and the IBM ECCST tape (enhanced capacity cartridge system tape, 36 track format), and (2) an IBM 3590 model B2A tape drive to access the IBM HPCT tape (high performance cartridge tape, 128 track format). The library 308 also includes a tape library manager 314, which oversees operations of the library 308, and may comprise a new design or a conventional manager for the specific configuration embodied by the library 308. In the illustrated example, the library manager 314 may comprise the library manager used in the IBM model 3494 tape library.

Turning to the components of the storage interface 304, the cache 306, an optional component, may be included in the subsystem 300 to provide a fast-access data storage location. As discussed in greater detail below, newly received data may be first stored in the cache 306, and then migrated to the tape library 308 upon satisfaction of some criteria, such as a period or level of non-use. In an illustrative embodiment, the cache 306 may comprise a magnetic disk storage device such as a high data capacity "hard drive."

The storage interface 304 includes a storage controller 310, a cache manager 312, and a catalog 328. The cache manager 312 oversees operations of the cache 306, and may comprise a new design or a conventional manager for the type of data storage device embodied by the cache 306. In the illustrated example, the cache manager 312 may comprise a disk drive controller. The catalog 328 is used by the storage controller 310 to maintain information about the location of the data stored within the data storage subsystem 300.

The storage controller 310 directs operations of the managers 312/314 and also moves data to/from the tape drives 326. The storage controller 310 receives commands and data from the hosts 302, and issues appropriate commands to direct the managers 312/314 to take the necessary actions to execute the hosts' commands. The storage controller 310 may comprise a digital processing apparatus such as a microprocessor, personal computer, or more advanced processing machine.

Preferably, the storage controller 310 maintains a status-list, showing each of the tape drives 326 as being "unavailable" or "available". Likewise, the library manager 314 also maintains a status-list, independently showing the unavailable/available status of each tape drive 326.

In an exemplary implementation, the hosts 302 may be embodied by a variety of types and numbers of units, such as: mainframe or personal computers; workstations; user consoles such as keyboards, terminals, or other input devices; application programs; etc. Also as an example, the storage interface 304 may be implemented by executing appropriate software programming with a processing unit such as an IBM model RS6000 RISC microprocessor. The storage interface 304 and cache 306 may be embodied, for example, in an IBM model 3494 B16 virtual tape server. In one exemplary embodiment, the automated tape library 308 may comprise an IBM model 3494 tape library.

In environment of the foregoing embodiment, external sources such as the external source 126 may comprise the library manager 314, a user console (not shown) coupled to the storage interface 304 or library 308, a customer engineer service panel, a connection to another ELF, or another suitable source.

If desired, the invention may be implemented in the foregoing embodiment of data storage subsystem 300 to provide a virtual tape storage (VTS) system. VTS systems chiefly store data on tape, taking advantage of this inexpensive means of long term data storage. However, to expedite data exchanges, data is cached in a DASD cache, which may be embodied in the cache 306. According to a predetermined criteria, such as the data's age or recency/frequency of use, the data is backed up on tape, e.g. the tape library 308. Cache misses result in older data being retrieved from tape and stored again in the DASD cache.

Additional information about VTSs, some of which are well known in the art, is provided by the following references: (1) U.S. Pat. No. 4,467,421, entitled "Virtual Storage System & Methods", issued Aug. 21, 1984, (2) U.S. patent application No. 08/707,891, entitled "Virtual Integrated Cartridge Loader for Virtual Tape Storage System", filed on Sep. 10, 1996 in the names of Carlson et al, and (3) U.S. patent application No. 08/778,118, entitled "Outboard Data Migration in a Volume Stacking Library", filed on Jan. 2, 1997, in the name of J. W. Peake. The contents of the foregoing references are incorporated by reference.

OPERATION

In addition to the various hardware embodiments described above, a different aspect of the invention concerns a method for communicating with a data storage subsystem.

Signal-Bearing Media

Such a method may be implemented, for example, by operating an appropriate processing unit, such as the computer 200 (FIG. 2) or the storage interface 304 (FIG. 3), to execute a sequence of machine-readable instructions. These instructions may reside in various types of signal-bearing media. In this respect, one aspect of the present invention concerns a signal-bearing media tangibly embodying a program of machine-readable instructions executable by a digital data processor to perform a method to communicate with a data storage subsystem.

Figure 4:
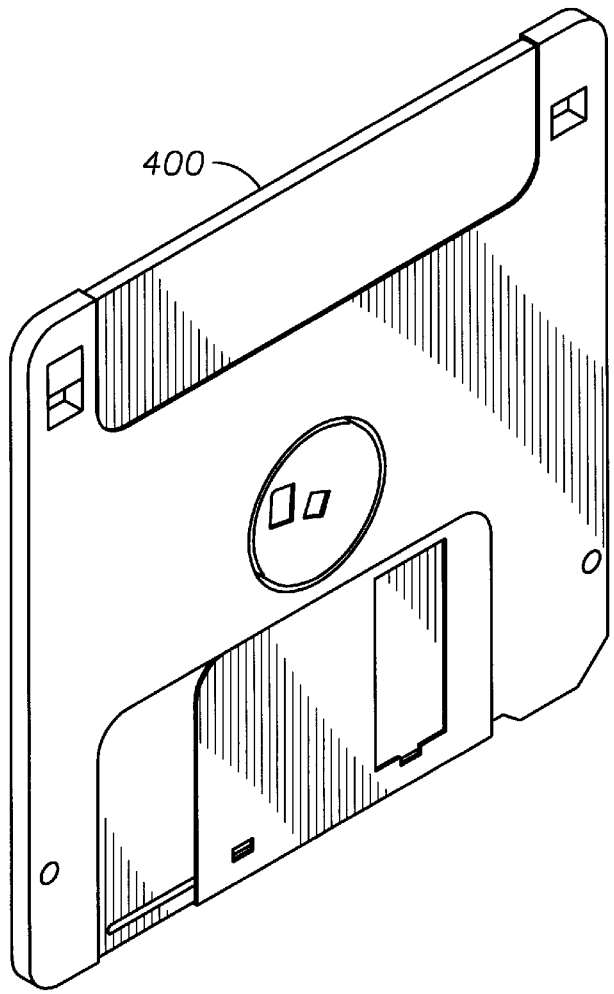
FIG. 4 is an exemplary signal-bearing medium according to the invention.

This signal-bearing media may comprise, for example, RAM embodied by the fast-access storage unit 204, or some memory accessible by the storage interface 304. Alternatively, the instructions may be contained in another signal-bearing media, such as a magnetic data storage diskette 400 (FIG. 4). Whether contained in the diskette 400, fast-access storage unit 204, storage interface 304, or elsewhere, the instructions may instead be stored on another type of data storage medium such as DASD storage (e.g., a conventional "hard drive" or a RAID array), magnetic tape, electronic read-only memory (e.g., CD-ROM or WORM), an optical storage device (e.g. WORM), paper "punch" cards, or other suitable signal-bearing media including transmission media such as digital and analog and communication links and wireless. In an illustrative embodiment of the invention, the machine-readable instructions may comprise lines of compiled "C" language code.

General Sequence of Operation

Figure 5:
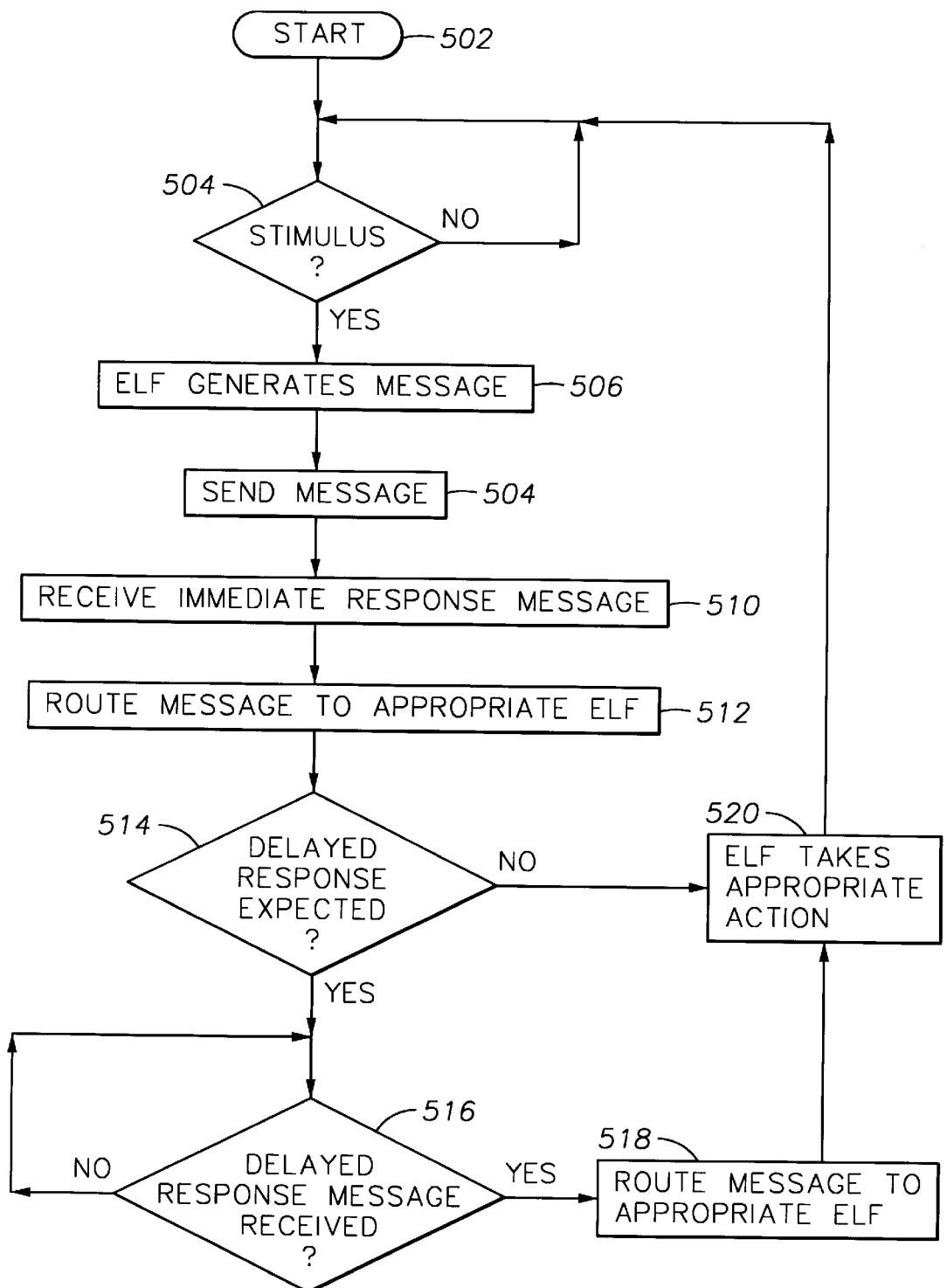
FIG. 5 is a flowchart depicting an illustrative operational sequence according to the invention.

FIG. 5 shows a sequence of method steps 500 to illustrate one example of the method aspect of the present invention. For ease of explanation, but without any limitation intended thereby, the example of FIG. 5 is described in the context of the automated message processing system 100 described above. FIG. 5 depicts task processing by the ELF 116, although these steps are similarly applicable to task processing in the other ELFs 117–121. For ease of illustration, the routine 500 depicts the full completion of a single task, in which the ELF 116 initiates action in response to an initiating stimulus, and performs subsequent follow-up in accordance with immediate-response and delayed-response messages.

After the steps are initiated in step 502, step 504 asks whether the ELF 116 has received an initiating stimulus. As shown below, an initiating stimulus triggers the ELF 116 to originate some action. The initiating stimulus contrasts with immediate-response and delayed-response messages, which are received by the ELF 116 during subsequent processing of an already-initiated task.

Initiating stimulus may be received at any of the inputs 116a–116d. Thus, the stimulus may comprise a timing event received from the timer 124, a signal from the external source 126, or a message from the data storage subsystem forwarded via the message console 112. Initiating stimuli may also be received from another ELF, in various ways. For instance, a second ELF may generate an initiating message and transmit back around to the first ELF, via the command generator 108, machine data storage subsystem 102, and SANTA 106. Or, the second ELF may constitute an external source (such as 126), in which case the second ELF sends the stimulus directly to the first ELF.

If stimulus has been received, step 504 advances to step 506, where the ELF 116 (receiving the stimulus) performs a predetermined action, which includes generation of an appropriate message in response to the stimulus. Each of the ELFs 104 is programmed to recognize certain types of stimuli, and perform one or more specific actions in response to each stimulus. Some specific examples of messages generated by the ELFs 104 are described in detail below.

After the ELF 116 generates the message, the message is sent in step 508. First, the ELF 116 passes the message to the command generator 108. Then, the command generator 108 places the message in a predetermined format, such as a specific format compatible with the data storage subsystem 102. Then (also in step 508), the command generator 108 dispatches the formatted message to an appropriate destination in the data storage subsystem 102. Preferably, the desired destination is identified by the message output by the ELF 116. Alternatively, the command generator 108 may choose the destination based upon the content of the ELF's output message. The command generator 108 may dispatch the message, for example, by transmitting the formatted message to a particular address in the data storage subsystem 102, where this address corresponds to the selected destination for the message.

In the present example, the formatted output message sent in step 508 requires a response before the system 100 can proceed. Thus, after dispatching the formatted output message, the system 100 waits for an immediate-response message. This occurs in step 510, where the SANTA 106 receives an immediate-response message, generated (not shown) by the data storage subsystem 102. More specifically, the command response unit 110 is the component that actually receives the immediate-response message.

Having received the necessary immediate-response message, the command response unit 110 in step 512 routes the message to an appropriate one of the ELFs 104, preferably the same ELF that initiated action in step 506. Then, in step 513, this ELF takes appropriate action (if any) in response to the immediate-response message. Next, step 514 asks whether the message sent in step 508 is the type where a delayed-response message is expected. If not, the ELF receiving the immediate-response message in step 512 takes appropriate action (if any) in step 520.

If step 514 expects a delayed-response message, however, step 516 waits until the expected delayed-response message is actually received. Then, after step 516, the message console 112 in step 518 routes the delayed-response message to an appropriate one of the ELFs 104. This routing is performed based on the content of the message. Following step 518, the ELF receiving the message takes appropriate action in step 520. Step 520 may involve doing nothing, performing a computation, invoking another process, or any other appropriate action. Furthermore, step 520 may involve generating another message, in which case, control is effectively returned to step 506.

After step 520, control returns to step 504, where the routine 500 starts over.

Implementation Details

As mentioned above, the preferred application of the invention implements the system 100 as an automated system administrator, in substitution for a human storage administrator, in a mass storage subsystem. The operation of the routine 500 in this particular environment is further embellished with the following description. Without any limitation thereby, the examples below are explained in the context of the data storage subsystem 300 of FIG. 3.

Received Messages

As one particular application, the data storage subsystem 102 may be provided by the storage interface 304 and the automated tape library 308, as mentioned above. In this example, the messages received by the SANTA 106 comprise ASCII messages normally sent by an IBM model 3494 B16 Virtual Tape Server (the storage interface 304) or an IBM model 3494 Tape Library (the tape library 308) to a human system administrator. Some examples of these messages are shown in Table 1, where "NNNN" represents a numerical code.

TABLE 1

ANSNNNN STORAGE POOL UPDATED
BACKGROUND PROCESS NNNN STARTED
BACKGROUND PROCESS NNNN FAILED
BACKGROUND PROCESS NNNN SUCCEEDED
ANSNNNN DEVICE CLASS UPDATED

Exemplary Sequences

To further explain the operation of the system 100 in a mass storage system, a number of ELFs and their operation are discussed as follows.

Reclamation

As an example, one or more ELFs may be implemented to perform a "reclamation" function, which consolidates data by removing valid data from a specified tape and copying the data to another tape, leaving only expired data on the original tape. In this embodiment, the ELF 116 in step 504 detects a stimulus comprising a message from the timer 124. This stimulus is received on the input 116a of the ELF 116. In this example, the timer 124 issues a "ENABLE RECLAMATION" message.

In response to the stimulus, the ELF 116 in step 506 generates an output message such as "UPDATE STORAGE POOL RECLAMATION=90%". The command generator 108 sends the message to the storage controller 310 in step 508. Then, in step 510, the SANTA 106 receives an immediate-response message from the storage controller 310. In this example, the immediate-response message may be "ANSNNNN STORAGE POOL UPDATED", where "NNNN" refers to a message number from the data storage subsystem 300. This being an immediate-response message, the command response unit 110 in step 512 routes the received message to the appropriate ELF, preferably the same ELF 116 that originated the procedure in step 506.

Following step 512, the ELF 116 in step 513 recognizes that no further action is required, and does nothing. Then, in step 514 the ELF 116 recognizes that a delayed-response message is also not expected in this case, and routes control to step 520. In step 520, the ELF recognizes that the storage pool has been updated as requested, and takes no action. In this case, "no action" is the appropriate action, since the task has completed successfully.

Check-In

In another example, one or more ELFs may be implemented to perform a media volume check-in function, which receives a new tape into the library 308. In this embodiment, the ELF 116 in step 504 detects a stimulus comprising a message from an external source 126, which in this case is another ELF. This stimulus is received on the input 116b of the ELF. In this example, the source 126 issues a "CHECK-IN LIBRARY VOLUME NNNN AS SCRATCH" message, which asks the system 100 to introduce a new volume of media into the data storage subsystem 300.

In response to the stimulus, the ELF 116 in step 506 generates an output message such as "CHECK-IN LIBRARY VOLUME IN LIBRARY-NAME, CARTRIDGE TYPE=3590, ACCESS=SCRATCH". This instructs the subsystem 300 that the new volume is an IBM model 3590 type tape, and is considered a "scratch" category volume. The command generator 108 sends the message to the storage controller 310 in step 508. Next, in step 510, the SANTA 106 receives an immediate-response message from the storage controller 310. In this example, the immediate-response message may be "BACKGROUND PROCESS NNNN STARTED", where "NNNN" is an identifier for the check-in process initiated in the subsystem 300. This being an immediate-response message, the command response unit 110 in step 512 routes the received message to the appropriate ELF, preferably the same ELF 116 that originated the procedure in step 506.

Following step 512, the ELF 116 in step 513 recognizes that no action is needed in response to the immediate-response message. Accordingly the ELF 116 proceeds to step 514. Recognizing that a delayed-response message is proper in this case, the ELF 116 routes control to step 516. Step 516 waits until the delayed-response message is received from the storage controller 310. This message may comprise a "BACKGROUND PROCESS NNNN SUCCEEDED" or "BACKGROUND PROCESS NNNN FAILED" message. Having received the delayed-response message, the message console 112 forwards the message to the appropriate ELF, preferably the ELF 116 that acted in step 506. In response, the ELF 116 in step 520 takes appropriate action, such as sending a completion notification message to the ELF that originated the check-in process in step 504.

Cartridge ID

In another example, one or more ELFs may be implemented to perform a cartridge-ID function, which identifies a tape cartridge with a specified identification (ID) code. In this embodiment, the ELF 116 in step 504 detects a stimulus comprising a message from an external source 126. This stimulus is received on the input 116b of the ELF 116. In this example, the external source 126 comprises another ELF or the library manager 314, which issues a "WHAT PHYSICAL CARTRIDGE IS EXTERNAL OBJECT ID NNNN?" message, asking the system 100 to identify a cartridge with a particular ID code.

In response to the stimulus, the ELF 116 in step 506 generates an output message such as "QUERY VOLUME USAGE EXTERNAL OBJECT ID=NNNN". This queries the subsystem 300 to determine the cartridge's ID. The command generator 108 sends the message to the storage controller 310 in step 508. In response, the storage controller 310 may, for example, consult the catalog 328 to determine the requested cartridge. Next, in step 510, the SANTA 106 receives an immediate-response message from the storage controller 310. In this example, the immediate-response message may be "OBJECT ID=ABCNNN", specifying the cartridge's label. This being an immediate-response message, the command response unit 110 in step 512 routes the received message to the appropriate ELF, preferably the same ELF 116 that acted in step 506.

Following step 512, the ELF 116 in step 513 takes no action, since none is required by the immediate-response message. In step 514, the ELF 116 recognizes that a delayed-response message is not expected in this case, and routes control to step 520. In step 520, the ELF 116 recognizes that the cartridge ID has been supplied as requested, and takes appropriate action by forwarding the cartridge ID to the originating ELF or library manager 314.

Tape Device Management

Figure 6A:
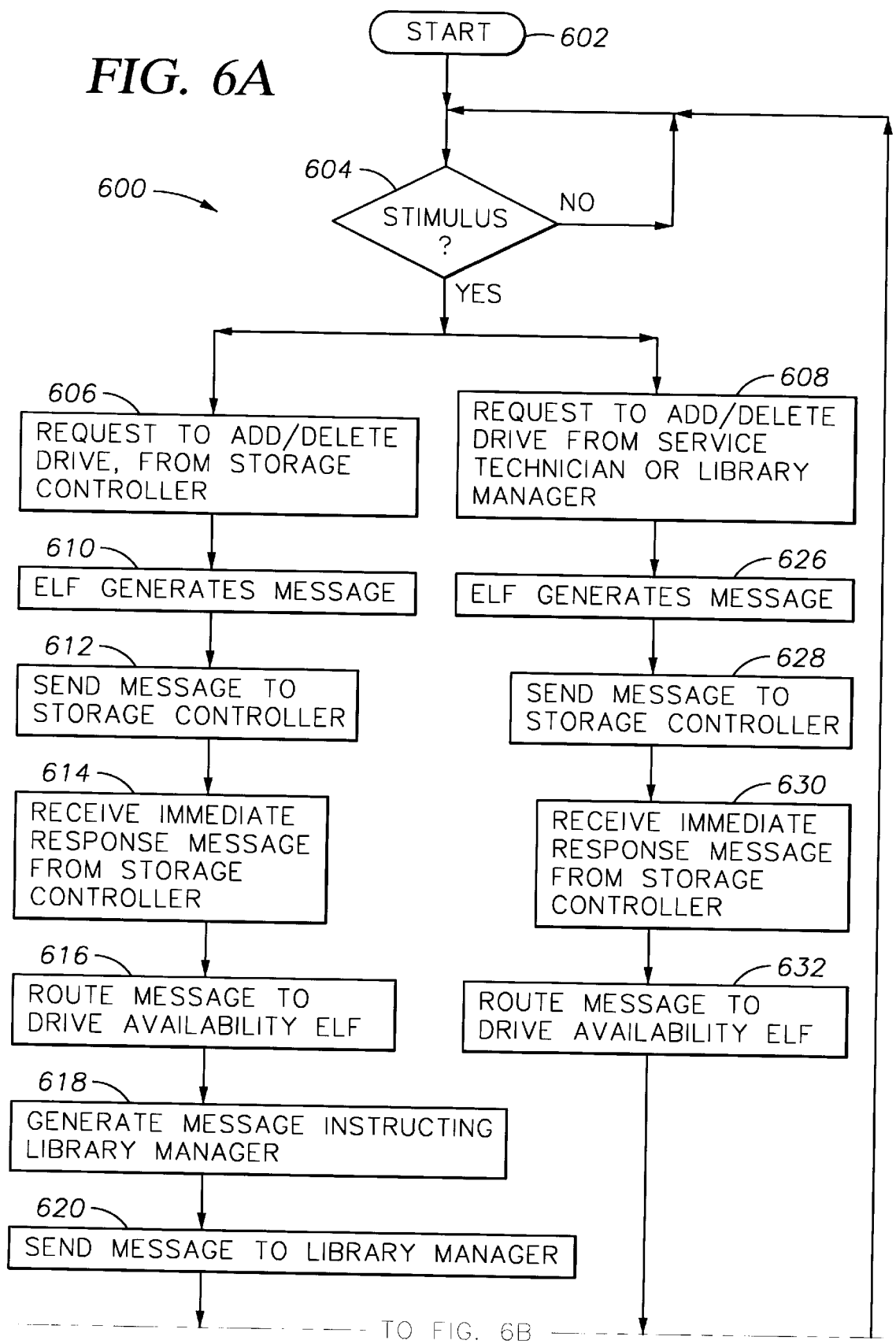
FIG. 6A–6C comprise a flowchart depicting an illustrative operational sequence for tape device management according to the invention.
Figure 6B:
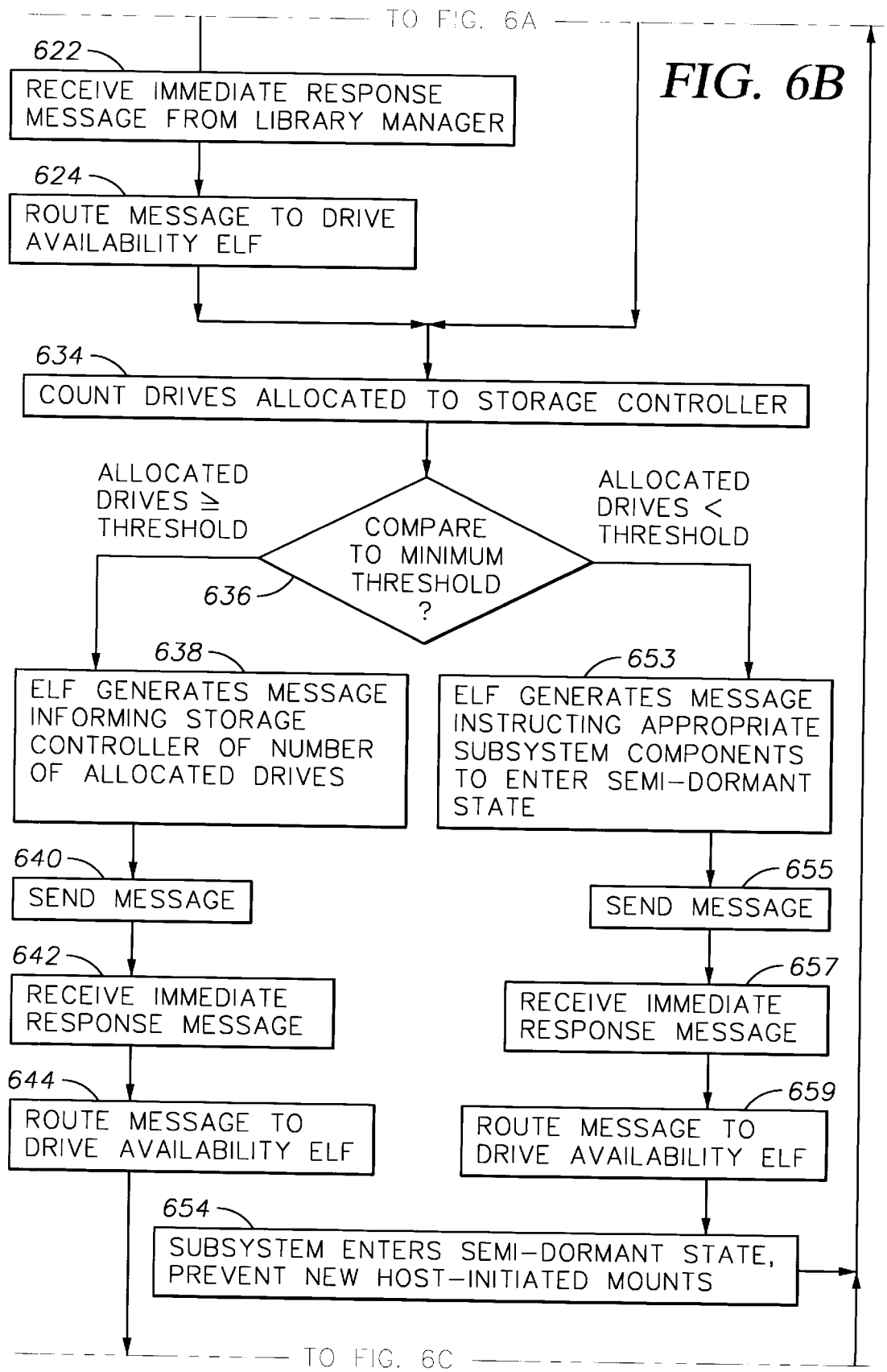
Figure 6C:
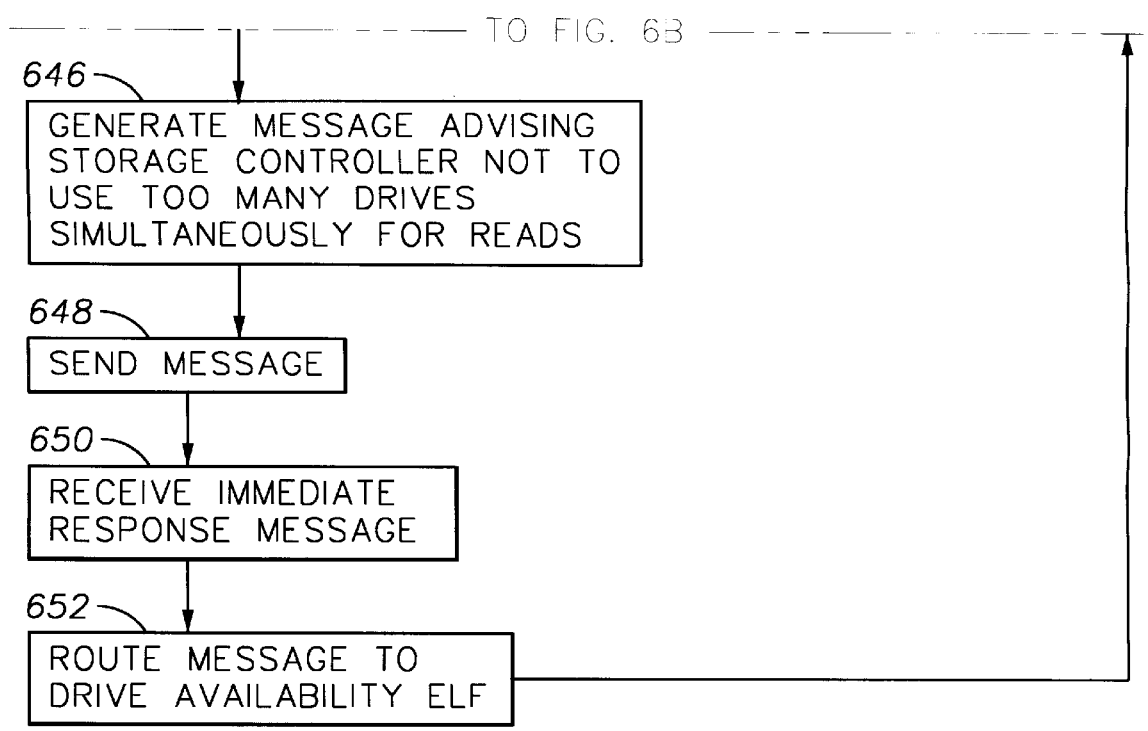

As still another example, one or more ELFs may be specifically implemented to assist with management of the tape drives 326. This function may be implemented using multiple ELFs, where each ELF contributes toward the overall job, or by using a single ELF. For ease of explanation, the illustrated example references a single ELF 116, called the "drive availability ELF". The presently described tape management function is carried out using the general model illustrated by the sequence 500 (FIG. 5). However, the tape management function involves many different messages, and thus -multiple passes through the routine 500. Therefore, a more comprehensive explanation is made using FIGS. 6A–6C, which illustrate a routine 600 involving multiple passes through the sequence 500. To fully explain the features of the routine 600, the following description refers to the data storage subsystem 300 (FIG. 3) as an example, although other systems (not shown) may be used instead.

In the subsystem 300, the tape drives 326 are "allocated" to the storage controller 310 or the library manager 314. Ordinarily skilled artisans (having the benefit of this disclosure) will recognize that, in an alternative embodiment, the tape drives 326 may also be allocated to another component or process without departing from the scope of the invention. Tape drives are allocated to the storage controller 310 for various procedures, such as: (1) Recall, where data is staged from tape to the cache 306 under direction of the storage controller 310, (2) Reclamation, where the storage controller 310 oversees a tape-to-tape transfer using two (or more) tape drives 326, (3) Retry, where a read or write operation fails at one tape drive 326 and is subsequently reattempted on a different one of the tape drives 326, and (4) Migration, where data is moved from the cache 306 onto tape. In the illustrated embodiment, all data transfers involving the cache 306 are managed by the storage controller 310. The library manager, on the other hand, manages operations local to the library 308, including any data exchanges between the tape drives 326 and components other than the cache 306 and storage interface 304.

A. Stimuli

After the routine 600 begins in step 602, the drive availability ELF 116 in step 604 detects a stimulus comprising a request to change allocation of the tape drives 326. This is done by "adding" or "deleting" drives to drive status lists separately maintained by the storage controller 310 and the library manager 314. If a formerly busy drive is freed up, it is desirable to "add" the drive to both drive status lists, marking its availability. Conversely, if a free drive is allocated for a data exchange with a tape, the drive is optimally deleted from both drive status lists. The present routing 600, among other things, helps ensure that the drive availability lists of the storage controller 310 and library manager 314 are both kept current, preventing errors that would otherwise result from an inconsistency.

The stimulus message may comprise, for example, a known drive availability request including a drive identifier, the new status for the drive (e.g., unavailable/available), a requesting source ID, and various other information. The stimulus may originate from a number of different sources, arriving at the ELF 116 in a number of different ways. In the particular arrangement shown in the example of FIG. 3, the stimulus may originate from the storage controller 310 or library manager 314, arriving through the SANTA 106. Or, the stimulus may originate from a service technician (not shown), who communicates with the ELF 116 using a service console (not shown) that constituting an external source 126. The stimulus may also originate with another one of the ELFs 104, ultimately being conveyed to the ELF 116 via the command generator 108, subsystem data storage subsystem 102, and SANTA 106, or alternatively being conveyed to the ELF 116 directly via an inter-ELF connection (not shown).

If the stimulus is received from the storage controller 310, path 606 is taken, leading to steps 610–624. Otherwise, path 608 is taken, leading to steps 626–632.

B. Stimulus from Storage Controller

In step 610, the ELF 116 responds to the stimulus by generating an output message advising the storage controller 310 to add/delete the requested drive in its drive status-list. An exemplary add request, for example, may be: "DEFINE DRIVE 1 DEVICE=/dev/rmto."In step 612, the command generator 108 formats and sends the message to the storage controller 310. Next, in step 614 the command response unit 110 receives an immediate-response message from the storage controller 310, confirming receipt of the message sent in step 612. An example of this message is "ANRNNNN DRIVE DRIVE 1 DEFINED IN LIBRARY". The command response unit 110 routes this message to the drive availability ELF 116 in step 616.

Recognizing that no delayed-response message is expected, the drive availability ELF 116 proceeds to take appropriate action in step 618. In particular, the ELF 116 in step 618 generates a message instructing the library manager 314 to add/delete the requested drive in its drive status-list. This message, as an example, may comprise an encoded binary data structure including embedded instruction and parameter codes. In step 620, the command generator 108 formats and sends the message to the library manager 314. Next, in step 622 the command response unit 110 receives an immediate-response message from the library manager 314, confirming receipt of the message sent in step 620. This message, as an example, may comprise an encoded binary data structure. The command response unit 110 routes this message to the drive availability ELF 116 in step 624.

Thus, steps 610–624 advantageously ensure that drive status lists are updated in both the storage controller 310 and the library manager 314.

C. Stimuli From Other Sources

Instead of steps 610–624, steps 626–632 are performed if the stimulus originates from a different source, such as the library manager 314 or a service technician working on the library 308. Steps 626–632 repeat steps 610–616, omitting steps 618–624. This is appropriate due to the source of the add/delete drive request.

Namely, in the illustrated example, it is unnecessary to advise the library manager 314 of the added or deleted drive because the library manager 314 of the IBM model 3494 tape library maintains accurate records of the allocation of the drives 326. Similarly, with add/delete requests originating from a service technician, it is desirable for library manager 314 continue to operate normally to enable proper testing and full operation of the drives 326. Thus, the library manager 314 is not advised of the added or deleted drive, fooling the library manager 314 into operating normally while the service technician tests or repairs the library using the added or deleted drive. Accordingly, with add/delete requests coming from a service technician, the modified sequence 626–632 is performed, omitting steps corresponding to steps 618–624.

Ordinarily skilled artisans, however, will recognize other schemes for informing different components of add/delete requests, in contrast to the specific example given in FIG. 6. For example, even in response to add/delete requests from the library manager 314, the entire sequence 610–624 may be performed if desired. Or, add/delete requests from the storage controller 310 may result in steps 616–624, skipping steps 610–614, if the storage controller 310 accurately maintains its own records of drive allocation.

D. Assess Current Drive Allocation

After step 624 or step 632, recognizing that no delayed-response message is expected, the drive availability ELF 116 proceeds to take appropriate action in step 634. Since the storage controller 310 and library manager 314 have been informed of the drive availability change, the ELF 116 proceeds to determine whether the current allocation is acceptable or not for the storage controller 310. This is critical because, as explained below, certain drive allocation schemes are disruptive to normal operations of the storage controller 310, which supervises data exchanges involving the cache 306. One disruptive condition may occur when the storage controller 310 uses too many drives 326 to read data into the cache 306, with too few drives 326 being used to store and thereby remove data from the cache 306. This may result in a disruptive cache overrun condition. This condition could be avoided by having more drives available to the storage controller 310 for migration of data from the cache 306 to tape. Another problematic situation occurs when only one tape drive is available, preventing the storage controller 310 from performing a Reclamation operation, which necessarily requires at least two drives. Similarly disruptive is a Retry operation, stalled when a failed operation cannot be carried out on a different drive because no other drives are available. Therefore, a number of error-prone conditions can arise when there are too few drives allocated to the storage controller 310.

Accordingly, in step 634, the ELF 116 counts the drives allocated to the storage controller 310. This can be achieved by accessing the storage controller's drive status list. Next, step 636 compares the number of allocated drives to a predetermined desired threshold of allocated drives. Preferably, this threshold is set empirically, based on the total number of drives and other characteristics of the subsystem 300. If the number of drives allocated to the storage controller falls short of the threshold, the ELF 116 generates a message instructing appropriate components of the subsystem 300 to enter semi-dormant state, preventing any new tape cartridge mounts in response to requests by the host 302. As an example, this message may comprise an encoded binary data structure including embedded instruction and parameter codes. In step 655, the command generator 108 formats and sends the message to the designated components of the storage subsystem 300. Next, in step 657, the command response unit 110 receives an immediate-response message from these affected components of the subsystem 300, confirming receipt of the message sent in step 655. This message, like the message of step 653, may comprise an encoded binary data structure including appropriate embedded instruction and parameter codes. The command response unit 110 routes this message to the drive availability ELF 116 in step 659.

In step 654, the affected components of the subsystem 300 enter a semi-dormant state. In the illustrated embodiment, these components include the storage controller 310 along with the library manager 314. However, either of these components may enter the semi-dormant states separately, if desired. In this state, as illustrated, the storage controller 310 and library manager 314 prevent new tape cartridge mounts in response to requests by the host 302. Thus, no data is permitted to be read into the cache 306 from tape in response to any new host requests. Operations already in progress, however, are preferably carried out. Also, any ongoing or future data migration operations are permitted, to help ease congestion of the cache 306. The semi-dormant state prevents the cache 306 from overrunning, and also helps avoid failed Retry and Reclamation operations. After step 654, the tape management routine 600 is finished, and control returns to step 604.

On the other hand, if the number of allocated drives meets or exceeds the threshold, control advances to step 638, where the ELF 116 generates a message informing the storage controller 310 of the number of tape drives allocated thereto. An example of this message is "UPDATE DEV-CLASS MOUNTLIMIT=NN". In step 640, the command generator 108 formats and sends the message to the storage controller 310. Next, in step 642 the command response unit 110 receives an immediate-response message from the storage controller 310, confirming receipt of the message sent in step 640. An example of this message is "ANRNNNN DEVICE CLASS UPDATED". The command response unit 110 routes this message to the drive availability ELF 116 in step 644.

Next, the ELF 116 in step 646 generates a command message, advising the storage controller 310 not to use more than a selected number of drives simultaneously. Preferably, this selected number equals the number of available drives minus N, where N is an empirically-determined integer such as one or two. As an example, if ten drives are available and N is preset to one, the command message of step 646 warns the storage controller not to use more than nine (i.e., ten minus one) drives simultaneously. An example of this message is "DYNOSET 9", which constitutes a system call to the storage controller 310. This prevents overrunning the cache 306. In step 648, the command generator 108 formats and sends the message to the storage controller 310. Next, in step 650 the command response unit 110 receives an immediate-response message from the storage controller 310, confirming receipt of the message sent in step 648. In the present example, where the message of step 646 is a system call, the immediate-response message of step 650 is a return code. The command response unit 110 routes this message to the drive availability ELF 116 in step 652. After step 652, the tape management routine 600 is finished, and control returns to step 604.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method of monitoring allocation of storage drives in a data storage subsystem that includes:
   a storage controller;
   a library including multiple storage drives to access removable media, said library including multiple items of said removable media and a library manager coupled to the storage controller; and
   an automated storage administrator coupled to the library manager and the storage controller, said automated storage administrator including:
      a plurality of expert local facilities (ELFs), each ELF performing predetermined actions responsive to each message routed thereto;
      a message director to receive input messages from the storage controller and library manager and route each of the received input messages to at least one ELF;
      a command generator to receive output messages from the ELFs, place the output messages into a predetermined format and dispatch the formatted output messages to a destination including at least one of the storage controller and the library manager;
   wherein said method comprises:
      allocating the drives between the storage controller and the library manager;
      the automated storage administrator receiving a message including a request to re-allocate the drives among the storage controller and the library manager;
      the message director routing the received message to a first one of the ELFs;
      the first ELF, in response to the routed message, performing the predetermined actions associated with the ELF, said predetermined actions including generation of an output message summarizing the requested re-allocation of the drives among the storage controller and the library manager;
      the command generator modifying the output message into a predetermined format to create a formatted output message;
      selecting a destination in the data storage subsystem from a group including: the library manager and the storage controller; and
      the command generator dispatching the formatted output message to the selected destination.

2. The method of claim 1, the selecting of the destination comprising:
   if the request to re-allocate the drives originated from the storage controller, selecting both the storage controller and the library manager as destinations.

3. The method of claim 1, the selecting of the destination comprising:
   if the request to re-allocate the drives originated from the library manager, selecting both the storage controller as a destination.

4. The method of claim 1, the first ELF, in response to the routed message, further:

counting all drives allocated to the storage controller to yield a number; and determining whether the number of drives allocated to the storage controller exceed a predetermined number.

5. The method of claim 4, further comprising:

if the number of drives allocated to the storage controller is less than a predetermined number:

the first ELF generating a second output message;

the command generator modifying the second output message into a predetermined format to create a formatted second output message;

the command generator dispatching the formatted second output message to the storage controller; and in response to the formatted second output message, the storage controller entering a semi-dormant state by abstaining from at least one predetermined type of operation.

6. The method of claim 5, the data storage subsystem being coupled to a host, the at least one predetermined type of operation including the storage controller initiating mounting of removal media to one of the tape drives in response to requests from the host.

7. The method of claim 5, the at least one predetermined type of operations including:

loading removable media into one of the tape drives for the purpose of reading data therefrom.

8. The method of claim 4, further comprising:

if the number of drives allocated to the storage controller is not less than the predetermined number:

the ELF generating a third output message stating the number of allocated drives;

the command generator modifying the third output message into a predetermined format to create a formatted third output message; and the command generator dispatching the formatted third output message to the storage controller.

9. The method of claim 4, further comprising:

if the number of drives allocated to the storage controller is not less than the predetermined number:

the ELF generating a warning message cautioning the storage controller against simultaneous read operations using at least a predetermined number of drives;

the command generator modifying the warning message into a predetermined format to create a formatted warning message; and the command generator dispatching the formatted warning message to the storage controller.

10. A signal-bearing medium tangibly embodying a program of machine-readable instructions executable by a digital processing apparatus to perform a method for monitoring allocation of storage drives in a data storage subsystem that includes a storage controller, a library including multiple storage drives to access removable media and multiple items of said removable media and a library manager coupled to the storage controller, and an automated storage administrator coupled to the library manager and the storage controller, said automated storage administrator including: a plurality of expert local facilities (ELFs), each ELF performing predetermined actions responsive to each messages routed thereto, a message director to receive input messages from the storage controller and library manager and route each of the received input messages to one or more ELFs, a command generator to receive output messages from the ELFs, place the output messages into a predetermined format, and dispatch the formatted output messages to a destination including at least one of the storage controller and the library manager, said method for monitoring allocation of storage drives comprising:

allocating the drives between the storage controller and the library manager;

the automated storage administrator receiving a message including a request to re-allocate the drives among the storage controller and the library manager;

the message director routing the received message to a first one of the ELFs;

the first ELF, in response to the routed message, performing the predetermined actions associated with the ELF, said predetermined actions including generation of an output message summarizing the requested re-allocation of the drives among the storage controller and the library manager;

the command generator modifying the output message into a predetermined format to create a formatted output message;

selecting a destination in the data storage subsystem from a group including: the library manager and the storage controller; and the command generator dispatching the formatted output message to the selected destination.

11. The medium of claim 10, the selecting of the destination comprising:

if the request to re-allocate the drives originated from the storage controller, selecting both the storage controller and the library manager as destinations.

12. The medium of claim 10, the selecting of the destination comprising:

if the request to re-allocate the drives originated from the library manager, selecting the storage controller as a destination.

13. The medium of claim 10, the first ELF, in response to the routed message, further:

counting all drives allocated to the storage controller to yield a number; and determining whether the number of drives allocated to the storage controller exceed a predetermined number.

14. The medium of claim 13, further comprising:

if the number of drives allocated to the storage controller is less than a predetermined number:

the first ELF generating a second output message;

the command generator modifying the second output message into a predetermined format to create a formatted second output message;

the command generator dispatching the formatted second output message to the storage controller; and in response to the formatted second output message, the storage controller entering a semi-dormant state by abstaining from at least one predetermined type of operation.

15. The medium of claim 14, the at least one predetermined type of operations including:

loading removable media into one of the tape drives for the purpose of reading data therefrom.

16. The medium of claim 13, further comprising:

if the number of drives allocated to the storage controller is not less than the predetermined number:

the ELF generating a third output message stating the number of allocated drives;

the command generator modifying the third output message into a predetermined format to create a formatted third output message; and the command generator dispatching the formatted third output message to the storage controller.

17. The medium of claim 13, further comprising:

if the number of drives allocated to the storage controller is not less than the predetermined number:
the ELF generating an output message generating a warning message cautioning the storage controller against simultaneous read operations using at least a predetermined number of drives;
the command generator modifying the warning message into a predetermined format to create a formatted warning message; and
the command generator dispatching the formatted warning message to the storage controller.

18. An automated storage administration apparatus for monitoring allocation of removable media drives in a data storage subsystem that includes a storage controller, a library including multiple storage drives to access removable media and multiple items of said removable media and a library manager coupled to the storage controller, said drives being allocated between the storage controller and the library manager, said automated storage admininstration apparatus comprising:

a message director, programmed to receive a request to re-allocate the drives among the storage controller and library manager and to route the received message to a first one of a plurality of expert local facilities (ELFs);

the plurality of ELFs, each programmed to perform predetermined actions in response to each message routed thereto, the first ELF programmed to generate an output message summarizing the requested re-allocation of the drives among the storage controller and the library manager; and a command generator programmed to receive the output message from the first ELF means, place the output message in a predetermined format, and dispatch the formatted output message to a destination including at least one of the storage controller and the library manager.

19. The apparatus of claim 18, the command generator being further programmed to select a destination in the data storage subsystem from a group including: the library manager and the storage controller.

20. The apparatus of claim 19, the command generator being programmed such that selection of the destination comprises:

if the request to re-allocate the drives originated from the storage controller, selecting the storage controller and the library manager as destinations.

21. The apparatus of claim 18, the command generator being programmed such that selection of the destination comprises:

if the request re-allocate the drives originated from the library manager, selecting the storage controller as a destination.

22. The apparatus of claim 18, the first ELF being further programmed to, in response to the routed message, further:

count all drives allocated to the storage controller to yield a number; and
determine whether the number of drives allocated to the storage controller exceed a predetermined number.

23. The apparatus of claim 22, the apparatus being programmed such that the process further comprises:

if the number of drives allocated to the storage controller is not less than the predetermined number:
the ELF generating a third output message stating the number of allocated drives;
the command generator modifying the third output message into a predetermined format to create a formatted third output message; and
the command generator dispatching the formatted output message to the storage controller.

24. The apparatus of claim 22, the processing apparatus being programmed such that the process further comprises:

if the number of drives allocated to the storage controller is not less than the predetermined number:
the ELF generating a warning message cautioning the storage controller against simultaneous read operations using at least a predetermined number of drives;
the command generator modifying the warning message into a predetermined format to create a formatted warning message; and
the command generator dispatching the formatted warning message to the storage controller.

25. An automated storage administration apparatus for monitoring allocation of removable media drives in a data storage subsystem that includes a storage controller, a library including multiple storage drives to access removable media and multiple items of said removable media and a library manager coupled to the storage controller, said drives being allocated between the storage controller and the library manager, said automated storage administration apparatus comprising:

a message directing means for receiving a request to re-allocate the drives among the storage controller and library manager and for routing the received message to a first one of a plurality of expert local facility (ELF) means;

the plurality of ELF means each for performing predetermined actions in response to each message routed thereto, the first ELF means for generating an output message summarizing the requested re-allocation of the drives among the storage controller and the library manager; and a command generating means for receiving the output message from the first ELF means, placing the output message in a predetermined format, and dispatching the formatted output message to a destination including at least one of the storage controller and the library manager.

26. A data storage subsystem, comprising:

a data storage facility, comprising:
a storage controller; and
a library including multiple storage drives to access removable media and multiple items of said removable media and a library manager coupled to the storage controller; and an automated storage administrator coupled to the library manager and the storage controller, to monitor allocation of removable media drives in the data storage facility, the automated storage administrator comprising:
a message director, programmed to receive a request to re-allocate the drives among the storage controller and library manager and to route the received message to a first one of a plurality of expert local facilities (ELFs);

the plurality of ELFs, each programmed to perform predetermined actions in response to each message routed thereto, the first ELF programmed to generate an output message summarizing the requested re-allocation of the drives among the storage controller and the library manager; and a command generator programmed to receive the output message from the first ELF means, place the output message in a predetermined format, and dispatch the formatted output message to a destination including at least one of the storage controller and the library manager.

27. The data storage subsystem of claim 26, the storage drives comprise magnetic data storage tape drives.

28. The data storage subsystem of claim 26, the storage drives comprising magnetic data storage disk drives.

29. The data storage subsystem of claim 26, the data storage facility comprising a virtual tape server.

* * * * *